United States Patent
Arima et al.

(10) Patent No.: US 12,444,549 B2
(45) Date of Patent: Oct. 14, 2025

(54) ELECTROLYTIC CAPACITOR

(71) Applicant: Panasonic Intellectual Property Management Co., Ltd., Osaka (JP)

(72) Inventors: Hiroyuki Arima, Osaka (JP); Honami Kojima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 106 days.

(21) Appl. No.: 18/580,619

(22) PCT Filed: Jul. 20, 2022

(86) PCT No.: PCT/JP2022/028246
§ 371 (c)(1),
(2) Date: Jan. 19, 2024

(87) PCT Pub. No.: WO2023/008288
PCT Pub. Date: Feb. 2, 2023

(65) Prior Publication Data
US 2024/0258042 A1    Aug. 1, 2024

(30) Foreign Application Priority Data
Jul. 26, 2021 (JP) .................................. 2021-121779

(51) Int. Cl.
*H01G 11/62* (2013.01)
*H01G 11/56* (2013.01)

(52) U.S. Cl.
CPC ............. *H01G 11/62* (2013.01); *H01G 11/56* (2013.01)

(58) Field of Classification Search
None
See application file for complete search history.

(56) References Cited

U.S. PATENT DOCUMENTS

| 11,081,287 | B2* | 8/2021 | Takatani | H01G 9/07 |
| 2017/0372846 | A1* | 12/2017 | Liu | H01G 9/035 |
| 2018/0197685 | A1 | 7/2018 | Tsubaki et al. | |
| 2020/0135408 | A1* | 4/2020 | Takatani | H01G 11/52 |
| 2024/0258042 | A1* | 8/2024 | Arima | H01G 9/028 |
| 2025/0166929 | A1* | 5/2025 | Kobayashi | H01G 9/02 |
| 2025/0191849 | A1* | 6/2025 | Kobayashi | H01G 9/025 |

FOREIGN PATENT DOCUMENTS

| JP | 2012-109635 | 6/2012 | | |
| WO | 2017/056447 | 4/2017 | | |
| WO | WO-2023127826 A1 * | 7/2023 | ............. | H01G 9/151 |

OTHER PUBLICATIONS

International Search Report of PCT application No. PCT/JP2022/028246 dated Oct. 18, 2022.

* cited by examiner

*Primary Examiner* — Dion R. Ferguson
(74) *Attorney, Agent, or Firm* — Rimon P.C.

(57) ABSTRACT

An electrolytic capacitor includes a capacitor element containing a conductive polymer and a liquid component. The liquid component includes a first anion component and a second anion component. The first anion component has a carbonyloxy bond. The second anion component has no carbonyloxy bond and has a sulfonylimide bond.

5 Claims, 2 Drawing Sheets

ELECTROLYTIC CAPACITOR

TECHNICAL FIELD

The present disclosure relates to an electrolytic capacitor.

BACKGROUND

As a capacitor having a small size, a large capacitance, and a low equivalent series resistance (ESR), promising candidates are electrolytic capacitors each including a capacitor element containing a conductive polymer, and an electrolytic solution. As the electrolytic solution, a liquid component such as a non-aqueous solvent or a solution obtained by dissolving a solute in a non-aqueous solvent is used.

International Publication WO 2017/056447 proposes that an electrolytic solution containing a solvent containing a glycol compound and a solute containing an acid component and a base component is used for an electrolytic capacitor. Here, the solute contains more acid components than the base component in mass ratio, and the acid component contains an aromatic compound having hydroxy.

Unexamined Japanese Patent Publication No. 2012-109635 proposes that a driving electrolytic solution including an organic solvent, a solute, and an additive agent is used for an electrolytic capacitor. Unexamined Japanese Patent Publication No. 2012-109635 describes that a solute includes a material of an acid component and a material of a base component, the material of the acid component has an organic carboxylic acid such as phthalic acid and an inorganic acid such as boric acid, and the acid component is made more excessive than the base component in terms of molar ratio.

SUMMARY

An electrolytic capacitor according to one aspect of the present disclosure includes a capacitor element containing a conductive polymer, and a liquid component. The liquid component includes a first anion component and a second anion component. The first anion component has a carbonyloxy bond. The second anion component has no carbonyloxy bond and has a sulfonylimide bond.

According to the present disclosure, it is possible to provide an electrolytic capacitor having low initial ESR and little fluctuation in ESR.

DESCRIPTION OF EMBODIMENT

Figure 1:
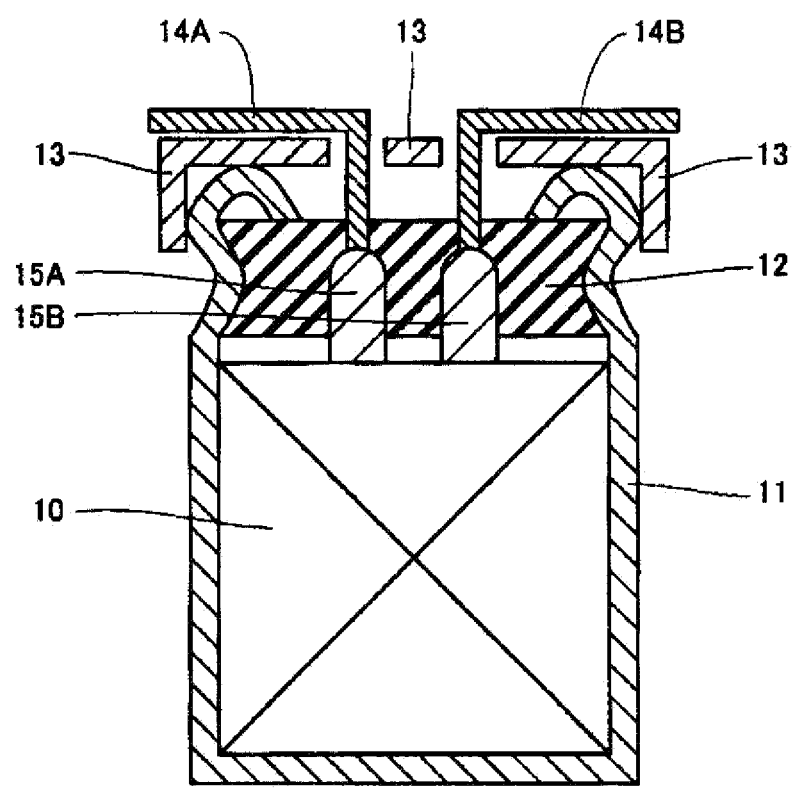
FIG. 1 is a schematic cross-sectional view illustrating an electrolytic capacitor according to an exemplary embodiment of the present disclosure.

Depending on the kind of the acid component contained in the liquid component of the electrolytic capacitor, the film restorability of a dielectric layer may be deteriorated, or the conductivity of a conductive polymer may be deteriorated. Therefore, it is difficult to maintain an equivalent series resistance (ESR) in low state or to secure stable capacitor performance.

As a liquid component of an electrolytic capacitor including a capacitor element containing a conductive polymer, a carboxylic acid such as phthalic acid may be used as an anion component. The carboxylic acid exhibits an appropriate pH, and thus has an effect of anodizing an anode body, and is excellent in film restorability, so that the effect of suppressing a leakage current is maintained. On the other hand, the carbonyloxy bond (—C(=O)—O—) easily causes a side reaction with a solvent or the like. In that case, an amount of the anion component decreases, and the pH of the liquid component fluctuates, so that the conductivity of the conductive polymer fluctuates, and the ESR fluctuates.

As the liquid component, an anion component having a pH lower than that of a carboxy group such as sulfonic acid or a derivative thereof may be used. When the pH of the liquid component is lowered, high conductivity of the conductive polymer is easily maintained, so that ESR is easily maintained low. However, when an anion component having a low pH is used, oxidation of the anode body proceeds too much to deteriorate film restorability, and corrosion of an electrode or the like easily occurs, so that capacitor performance is deteriorated.

As described above, in the conventional electrolytic capacitor, it is difficult to ensure stable capacitor performance (for example, to suppress a fluctuation in ESR in long-term use.) while ensuring initial low ESR.

In view of the above, in the electrolytic capacitor of the present disclosure, a liquid component containing a first anion component and a second anion component is used. The first anion component has a carbonyloxy bond. The second anion component has no carbonyloxy bond and has a sulfonylimide bond. By using such a liquid component, excellent film restorability of the dielectric layer can be secured, and high conductivity of the conductive polymer can be maintained. Furthermore, corrosion of the electrode can be reduced. Thus, stable capacitor performance can be secured while initial ESR is kept low. More specifically, the fluctuation in ESR in long-term use can be kept low. Furthermore, since the excellent film restorability of the dielectric layer can be secured, the leakage current can be suppressed.

The first anion component is a component having a carbonyloxy bond (—C(=O)—O—) and exhibiting anionicity. The second anion component is a component that does not have a carbonyloxy bond and exhibits anionicity, and has a sulfonylimide bond (—S(=O)$_2$—NH—). The sulfonylimide bond in the second anion component may be a sulfonylamide group (—S(=O)$_2$—NH$_2$).

Hereinafter, the electrolytic capacitor of the present disclosure will be described in more detail.

(Liquid Component)

The liquid component contains a first anion component and a second anion component, and usually contains a solvent. The liquid component may contain another anion component (third anion component), a cation component, an additive agent, and the like as necessary.

(First Anion Component)

Examples of the first anion component include an acid having a carbonyloxy bond and an anionic derivative of the acid having a carbonyloxy bond.

Examples of the acid having a carbonyloxy bond include carboxylic acid, oxocarbon acid, and meldrum acid. Examples of the oxocarbon acid include delta acid, squaric acid, croconic acid, rhodizonic acid, and heptagon acid. Examples of the carboxylic acid include aliphatic carboxylic acid and aromatic carboxylic acid. The acid having a carbonyloxy bond also includes a sulfoaromatic carboxylic acid. Examples of the sulfoaromatic carboxylic acid include p-sulfobenzoic acid, 3-sulfophthalic acid, and 5-sulfosalicylic acid. Among them, an aromatic carboxylic acid (in particular, aromatic hydroxy acids and aromatic polycarboxylic acids) is preferable because of its high stability. Specifically, benzoic acid, phthalic acid, pyromellitic acid, salicylic acid, or the like can be used as the aromatic carboxylic acid. Among them, phthalic acid, salicylic acid, and benzoic acid are preferable.

The acid having a carbonyloxy bond constituting the derivative is preferably a hydroxy acid or a polycarboxylic acid (dicarboxylic acid or the like). Examples of the hydroxy acid include aliphatic hydroxy acids (glycolic acid, lactic acid, tartronic acid, hydroxybutyric acid, malic acid, citric acid, and the like) and aromatic hydroxy acids (salicylic acid, hydroxybenzoic acid, mandelic acid, benzylic acid, gallic acid, and the like). Examples of the polycarboxylic acid include aliphatic polycarboxylic acids (oxalic acid, malonic acid, succinic acid, adipic acid, maleic acid, and the like) and aromatic polycarboxylic acids (phthalic acid and the like).

Examples of the derivative include a coordination compound of an acid having a carbonyloxy bond. Examples of such a coordination compound include a coordination compound in which at least one central atom selected from the group consisting of boron, aluminum, and silicon and an acid having a carbonyloxy bond are bonded to the central atom. The coordination compound can have a structure in which at least an oxy group of a carbonyloxy bond of an acid is coordinated to a central atom. In a case where the acid has two or more carbonyloxy bonds, the coordination compound may have a structure in which each of the oxy groups of at least two carbonyloxy bonds is coordinated to the central atom. In a case where the acid has a hydroxy group, the coordination compound may have a structure in which an oxygen atom derived from a hydroxy group and an oxy group of a carbonyloxy bond are coordinated to a central atom.

Specific examples of the coordination compound include, but are not limited to, borodisalicylic acid, borodioxalic acid, borodiglycolic acid, and borogallic acid.

The liquid component may contain one kind of the first anion component, or may contain two or more kinds in combination. Among the first anion components, phthalic acid, salicylic acid, benzoic acid, borodisalicylic acid, borodioxalic acid, borodiglycolic acid (in particular phthalic acid, salicylic acid, borodisalicylic acid), and the like are preferable.

In the electrolytic capacitor, the anionic group of the first anion component may be contained in any form of an anion such as a carboxy anion (—COO—), a free acid (—COOH), a salt, and the like. Furthermore, the coordination compound may be anionic in a state in which the carbonyloxy bond moiety is coordinated to the central atom. These forms may be referred to as anionic groups.

(Second Anion Component)

The second anion component commonly has a sulfonylimide bond —S(=O)$_2$—NH—. Examples of such a second anion component include anion components having —S(=O)$_2$—NH—, —S(=O)$_2$—NH—C(=O)—, —NH—S(=O)$_2$—NH—, —S(=O)$_2$—NH—S(=O)$_2$—, or the like. Such a second anion component can form a sulfonylimide anion. The second anion component may have a cyclic structure including a sulfonylimide bond or a chain structure. An aromatic ring or the like may be fused to the cyclic structure. Furthermore, at least one of a sulfonyl group and an imide group may have a ring (an aromatic ring, an aliphatic ring, a heterocyclic ring, or the like).

Specific examples of the second anion component include saccharin (pKa:1.6), 1,2-benzenedisulfonic acid imide (pKa:−1.1), cyclohexafluoropropane-1,3-bis (sulfonyl) imide (pKa:−7.8), 4-methyl-N-[(4-methylphenyl) sulfonyl] benzenesulfonamide (pKa:−0.5), dibenzenesulfonimide (pKa:−1.1), trifluoromethanesulfonanilide (pKa:4.35), N-[(4-methylphenyl) sulfonyl] acetamide (pKa:7.9), benzenesulfonanilide (pKa:8.5), and N,N'-diphenylsulfamide (pKa:5.4), but are not limited thereto.

From the viewpoint of having a high effect of stably maintaining the pH of the liquid component in a low state, an acid dissociation constant pKa of the second anion component in the form of a free acid is preferably 5.0 or less. In a case where the pKa is 5.0 or less, the second anion component is easily dissociated, and the pH of the liquid component is easily lowered. In a case where the pH of the liquid component is low, dedoping hardly occurs, and high conductivity of the conductive polymer is easily maintained stably. On the other hand, in a case where the pH of the liquid component is too low, a metal portion (for example, an electrode) in contact with the liquid component in the electrolytic capacitor may corrode. From the viewpoint of suppressing such corrosion, the pKa of the second anion in the form of a free acid is preferably higher than −2.0, and more preferably −1.0 or more.

In the present specification, the acid dissociation constant (pKa) means an acid dissociation constant in water at a temperature of 25° C. In a case where the anion component in the form of a free acid exhibits more than one pKa, it means the highest pKa (that is, pKa$_1$).

The pKa of the second anion component in the form of a free acid is adjusted, for example, by adjusting a distribution state of electrons in the imide group of the sulfonylimide group. For example, in a case where an electron donating group such as a phenyl group or a tolyl group is bonded to the imide group, the pKa tends to be high. In a case where a sulfonyl group is bonded to one bond of the imide group and an electron withdrawing group such as a sulfonyl group or a carbonyl group is bonded to the other bond, the pKa tends to be low. Either an electron donating group or an electron withdrawing group may be bonded to the sulfonyl group bonded to the imide group, but in a case where the electron withdrawing group is bonded to the sulfonyl group, the pKa tends to be lower than that in a case where the electron donating group is bonded. For example, in a case where a hydrocarbon group having a fluorine atom such as a fluoroalkyl group is bonded to a sulfonyl group, the effect of reducing pKa is enhanced. In consideration of these, it is preferable to select the second anion component.

In a case where the second anion component has —S(=O)$_2$—NH—C(=O)— or —S(=O)$_2$—NH—S(=O)$_2$—, the second anion component is preferably a second anion component in which an electron donating group is bonded to at least one of a sulfonyl group and a carbonyl group or at least one of two sulfonyl groups. In a case where the second anion component has —S(=O)$_2$—NH— (However, neither a carbonyl group nor a sulfonyl group is bonded to NH), the second anion component in which an electron donating group is bonded to the imide group and an electron withdrawing group is bonded to the sulfonyl group is preferable. Among them, saccharin (pKa: 1.6), 4-methyl-N-[(4-methylphenyl) sulfonyl] benzenesulfonamide (pKa:−0.5), trifluoromethanesulfonanilide (pKa: 4.35), and the like are preferable from the viewpoint of having an appropriate pKa and easy availability.

The liquid component may contain one kind of the second anion component, or may contain two or more kinds in combination.

In the electrolytic capacitor, the anionic group of the second anion component may be contained in any form of a sulfonylimide anion (—S(=O)$_2$—N$^+$—), a free acid (—S(=O)$_2$—NH—), a salt, or the like. These forms may be referred to as anionic groups.

The content of the second anion component is preferably 3 parts by mass or more, and more preferably 5 parts by mass or more (or 10 parts by mass or more) with respect to 100 parts by mass of the first anion component. In a case where the content of the second anion component is in such a range, it is easy to keep the pH of the liquid component low even if the first anion component disappears due to side reaction or the like, and it is easy to reduce the decrease in conductivity of the conductive polymer. From the viewpoint of enhancing the effect of suppressing the fluctuation in ESR, the content of the second anion component with respect to 100 parts by mass of the first anion component is more preferably 12.5 parts by mass or more (or 25 parts by mass or more), still more preferably 18 parts by mass or more (or 35 parts by mass or more). The content of the second anion component is, for example, 250 parts by mass or less (or 120 parts by mass or less), 230 parts by mass or less (or 115 parts by mass or less), or 227 parts by mass or less with respect to 100 parts by mass of the first anion component. In a case where the content of the second anion component is in such a range, the effect of restoring the film of the dielectric layer by the first anion component is easily obtained. These upper limit value and lower limit values can be arbitrarily combined. However, the content of each anion component is determined in terms of free acid, not anion or salt.

(Third Anion Component)

The liquid component may contain an anion component (third anion component) other than the first anion component and the second anion component as necessary. Examples of the third anion component include a phenol compound (picric acid, p-nitrophenol, pyrogallol, catechol, etc.), a coordination compound of a phenol compound (borodicatechol, borodipyrogallol, etc.), a sulfur-containing acid (sulfuric acid, sulfonic acid (aromatic sulfonic acid, etc.), oxyaromatic sulfonic acid (phenol-2-sulfonic acid, etc.), etc.), a boron-containing acid (boric acid, halogenated boric acid (tetrafluoroboric acid, etc.), or partial esters thereof, etc.), a phosphorus-containing acid (phosphoric acid, halogenated phosphoric acid (hexafluorophosphoric acid, etc.), phosphonic acid, phosphinic acid, or partial esters thereof), a nitrogen-containing acid (nitric acid, nitrous acid, etc.), and p-nitrobenzene. The liquid component may contain one kind of the third anion component, or may contain two or more kinds in combination.

The third anion component may be contained in the liquid component in the form of an anion, in the free form, or in the form of a salt. All of these forms may be referred to as a third anion component.

The content of the third anion component may be, for example, 30 parts by mass or less (or 15 parts by mass or less) and 20 parts by mass or less (or 10 parts by mass or less) with respect to 100 parts by mass of the first anion component. In a case where the liquid component contains the third anion component, the content may be 0.1 parts by mass or more with respect to 100 parts by mass of the first anion. It is also preferable that the liquid component does not contain the third anion component. The case where the third anion component is not contained includes a case where the third anion component or a trace thereof in the liquid component is less than or equal to a detection limit. However, the content of the third anion component is determined in terms of free acid, not anion or salt.

(Solvent)

Examples of the solvent include a sulfone compound, a lactone compound, a carbonate compound, and a polyhydric alcohol. The liquid component may contain one kind of solvent, or may contain two or more kinds in combination.

Examples of the sulfone compound include sulfolane (SL), dimethyl sulfoxide, diethyl sulfoxide, and the like. Examples of the lactone compound include γ-butyrolactone (GBL) and γ-valerolactone. Examples of the carbonate compound include dimethyl carbonate, diethyl carbonate, ethyl methyl carbonate, ethylene carbonate, propylene carbonate, and fluoroethylene carbonate.

Examples of the polyhydric alcohol include a glycerin compound, a sugar alcohol compound, and a glycol compound.

Examples of the glycerin compound include glycerin, polyglycerin (diglycerin, triglycerin, etc.), and derivatives thereof. The repeating number of the glycerin unit in the polyglycerin is, for example, in a range from 2 to 20, inclusive, and may be in a range from 2 to 10, inclusive. Examples of the sugar alcohol compound include sugar alcohols (erythritol, mannitol, pentaerythritol, and the like) and derivatives thereof. Examples of the derivative include alkylene oxide adducts (adducts in which one alkylene oxide is added to one hydroxy group of glycerin, polyglycerin, or sugar alcohol, and the like). Examples of the alkylene oxide adduct include $C_{2-4}$ alkylene oxide adducts (such as ethylene oxide adducts).

Examples of the glycol compound include an alkylene glycol ($C_{2-4}$ alkylene glycol (ethylene glycol (EG), propylene glycol, and the like), and the like), a polyalkylene glycol (poly$C_{2-4}$ alkylene glycol (diethylene glycol, dipropylene glycol, triethylene glycol, polyethylene glycol (PEG), and the like), and the like), and a polyalkylene oxide adduct (a poly$C_{2-4}$ alkylene oxide adduct, and the like (a polyethylene oxide adduct, and the like)) of a sugar alcohol (glycerin, erythritol, mannitol, pentaerythritol, and the like).

The weight-average molecular weight (Mw) of the polyalkylene oxide adduct of the polyalkylene glycol or the sugar alcohol is, for example, in a range from 150 to 3000, inclusive, and may be in a range from 200 to 1000, inclusive. Mw is a value in terms of polystyrene measured by gel permeation chromatography (GPC). Note that the GPC is typically measured using a polystyrene gel column, and water and methanol (volume ratio: 8/2) as a mobile phase.

(Cationic Component)

The liquid component may contain the cationic component in a cationic form, a free form, or a salt form. All of these forms may be referred to as a cation component.

Examples of the cation component include ammonia, an amine (specifically, a primary amine, a secondary amine, and a tertiary amine), a quaternary ammonium compound, and an amidinium compound. The amine may be any of aliphatic, aromatic, and heterocyclic. Examples of the amine include trimethylamine, diethylamine, ethyldimethylamine, triethylamine, ethylenediamine, aniline, pyrrolidine, imidazole (such as 1,2,3,4-tetramethylimidazolinium), and 4-dimethylaminopyridine. Examples of the quaternary ammonium compound include amidine compounds (also containing imidazole compounds). The liquid component may contain one cationic component, or may contain two or more cationic components in combination.

A molar ratio of a total amount of the anion component to the cation component (anion component/cation component) may be, for example, 0.5 or more, or 1 or more. From the viewpoint of suppressing dedoping and easily securing high conductivity of the conductive polymer, it is preferable to use an anion component in excess of the cation component. The molar ratio of the total amount of the anion component to the cation component is preferably 1.1 or more, and may be 1.5 or more. The molar ratio of the total amount of the anion component to the cation component is, for example, 50 or less, and may be 20 or less. These lower limit value and upper limit value can be arbitrarily combined.

The molar ratio of the first anion component to the cation component (=first anion component/cation component) is preferably 1 or more, more preferably 1.1 or more, and may be 1.5 or more. In a case where the molar ratio is in such a range, it is easy to suppress a fluctuation in pH of the liquid component and to maintain high conductivity of the conductive polymer. The molar ratio is preferably 10 or less, more preferably 5 or less from the viewpoint of easily securing higher film restorability. These lower limit value and upper limit value can be arbitrarily combined.

A total concentration of the anion component and the cation component in the liquid component is, for example, 0.1 mass % or more and 30 mass % or less, may be 0.5 mass % or more and 25 mass % or less, or may be 0.5 mass % or more and 15 mass % or less. In a case where the total concentration of the anion component and the cation component is in such a range, dedoping of the dopant is easily suppressed. However, the content of each anion component is determined in terms of a free acid, and the content of the cation component is determined in terms of a free base.

The pH of the liquid component is preferably 6 or less, more preferably 4 or less, and may be 3.8 or less, or 3.6 or less. By setting the pH of the electrolytic solution in such a range, deterioration of the conductive polymer component is easily suppressed. The pH is preferably 1.0 or more.

Note that the components contained in the liquid component can be identified using an infrared absorption spectrum, an ultraviolet-visible absorption spectrum, a gas chromatograph mass spectrometry method, a liquid chromatograph mass spectrometry method, a magnetic resonance spectrum, or the like, using the liquid component collected from the electrolytic capacitor. The liquid component is preferably collected from an initial electrolytic capacitor. The initial electrolytic capacitor is an electrolytic capacitor after break-in charging and discharging or an unused electrolytic capacitor if it is a commercially available product. Quantitative analysis of components contained in the liquid component can be performed using a calibration curve method or the like in the above analysis method.

(Capacitor Element)

The capacitor element includes a conductive polymer. The capacitor element usually includes at least an anode body having a dielectric layer on a surface thereof and a conductive polymer covering a part of the dielectric layer.

(Anode Body)

The anode body may include a valve metal, an alloy containing the valve metal, a compound containing the valve metal, or the like. These materials can be used singly or in combination of two or more types thereof. As the valve metal, for example, aluminum, tantalum, niobium, and titanium are preferably used. The anode body having a porous surface can be obtained, for example, by roughening a surface of a base material (such as a foil-shaped or plate-shaped base material) containing the valve metal by etching or the like. Furthermore, the anode body may be a molded body of particles that contain the valve metal or a sintered body of the molded body. Note that the sintered body has a porous structure.

(Dielectric Layer)

The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on a porous surface of the anode body, the dielectric layer is formed along inner wall surfaces of holes and hollows (pits) in the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited to the ones described above, and any dielectric layer may be used as long as the dielectric layer functions as a dielectric body. When the anode body has a porous surface, the dielectric layer is formed along the surface of the anode body (including inner wall surfaces of holes).

(Conductive Polymer)

The conductive polymer includes, for example, a conjugated polymer and a dopant. The conductive polymer is attached so as to cover a part of the dielectric layer. The conductive polymer attached to a surface of the dielectric layer may constitute a layer. The conductive polymer may be referred to as a solid electrolyte. The conductive polymer constitutes at least a part of a cathode body in the electrolytic capacitor. The conductive polymer may further contain an additive agent as necessary.

(Conjugated Polymer)

Examples of the conjugated polymer include a known conjugated polymer used for an electrolytic capacitor, for example, a π-conjugated polymer. Examples of the conjugated polymer include polymers having polypyrrole, polythiophene, polyaniline, polyfuran, polyacetylene, polyphenylene, polyphenylene vinylene, polyacene, and polythiophene vinylene as a basic skeleton. The polymer may include at least one kind of monomer unit constituting the basic skeleton. The above-mentioned polymers also include a homopolymer, a copolymer of two or more kinds of monomers, and derivatives of these polymers (a substitute having a substituent group, etc.). For example, polythiophene includes poly (3,4-ethylenedioxythiophene) and the like.

As the conjugated polymer, one kind may be used alone, or two or more kinds may be used in combination.

The conjugated polymer has a weight-average molecular weight (Mw) that is not particularly limited, and that is in a range from 1,000 to 1,000,000, for example.

Note that the weight-average molecular weight (Mw) herein is a value in terms of polystyrene measured by gel permeation chromatography (GPC). Note that the GPC is typically measured using a polystyrene gel column, and water and methanol (volume ratio: 8/2) as a mobile phase.

(Dopant)

Examples of the dopant include relatively low molecular anions and polymer anions. Examples of the anion include a sulfate ion, a nitrate ion, a phosphate ion, a borate ion, an organic sulfonate ion, and a carboxylate ion. Compounds that produce these anions are used as dopants. Examples of the dopant that generates sulfonate ions include para-toluenesulfonic acid and naphthalenesulfonic acid.

Examples of the polymer anion are polyvinylsulfonic acid, polystyrenesulfonic acid, polyallylsulfonic acid, polyacrylsulfonic acid, polymethacrylsulfonic acid, poly (2-acrylamide-2-methylpropanesulfonic acid), polyisoprenesulfonic acid, polyestersulfonic acid (aromatic polyestersulfonic acid and the like), phenolsulfonic acid novolac resin, and polyacrylic acid. The polymeric anion may be a polymer of a single monomer, a copolymer of two or more monomers, or a substitution product having a substituent. Of these, a polyanion derived from polystyrenesulfonic acid is preferable.

However, these dopants are merely exemplary and not limited thereto. The dopant may be used singly or in combination of two or more kinds thereof.

The conductive polymer can be formed, for example, by chemically polymerizing and/or electrolytically polymerizing a precursor of a conjugated polymer on the dielectric layer in the presence of a dopant. Alternatively, the conductive polymer layer can be formed by bringing a solution in which the conductive polymer is dissolved or a dispersion liquid in which the conductive polymer is dispersed into contact with the dielectric layer. The conductive polymer used in these solutions or dispersions can be obtained by polymerizing a precursor of a conjugated polymer in the presence of a dopant. Examples of the precursor of the conjugated polymer include a raw material monomer of the conjugated polymer, and an oligomer and a prepolymer in which a plurality of molecular chains of the raw material monomer are linked. One kind of precursor may be used, or two or more kinds of precursor may be used in combination.

The content of the dopant contained in the conductive polymer ranges, for example, from 10 parts by mass to 1000 parts by mass, inclusive, and may range from 20 parts by mass to 500 parts by mass, inclusive, or 50 parts by mass to 200 parts by mass, inclusive, with respect to 100 parts by mass of the conjugated polymer.

(Cathode Body)

Similarly to the anode body, a metal foil may be used for the cathode body. The type of the metal is not particularly limited, but it is preferable to use a valve metal such as aluminum, tantalum, or niobium or an alloy containing the valve metal. A surface of the metal foil may be roughened as necessary. On the surface of the metal foil may be provided an anodization film, a film of a metal (different type of metal) different from the metal that constitutes the metal foil, or a nonmetal film. Examples of the different type of metal and the nonmetal include metals such as titanium and nonmetals such as carbon.

(Separator)

When the metal foil is used for the cathode body, a separator may be disposed between the metal foil and the anode body. Available examples of the separator include, but are not particularly limited to, an unwoven fabric including fibers of cellulose, polyethylene terephthalate, vinylon, and polyamide (e.g., aliphatic polyamide or aromatic polyamide such as aramid).

(Others)

The electrolytic capacitor may be a wound type, or may be either a chip type or a stack type. The electrolytic capacitor may include at least one capacitor element, and may include a plurality of capacitor elements. For example, the electrolytic capacitor may include a stack of two or more capacitor elements, or may include two or more wound-type capacitor elements. The configuration or number of the capacitor elements may be selected according to the type or use of the electrolytic capacitor.

All of the features described herein are arbitrarily combined.

Hereinafter, the electrolytic capacitor of the present disclosure will be described more specifically based on exemplary embodiments. However, the electrolytic capacitor of the present disclosure is not limited to the following exemplary embodiments.

Figure 2:
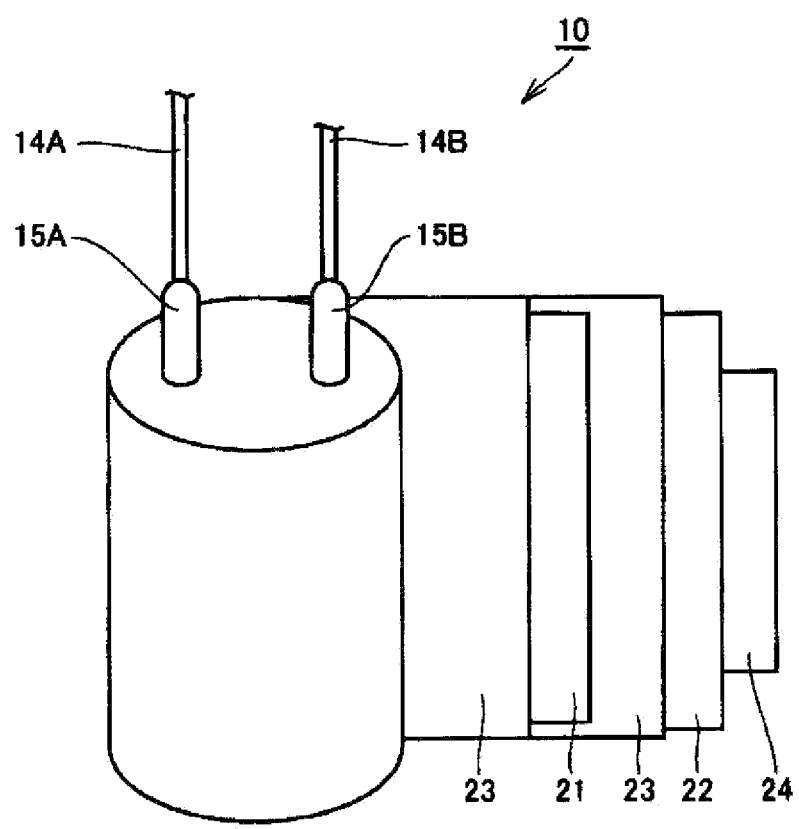
FIG. 2 is a schematic diagram for explaining a configuration of a capacitor element in FIG. 1.

FIG. 1 is a schematic cross-sectional view illustrating an electrolytic capacitor according to the present exemplary embodiment, and FIG. 2 is a schematic view of a partially developed capacitor element of the electrolytic capacitor.

An electrolytic capacitor illustrated in FIG. 1 includes capacitor element 10, bottomed case 11 that houses capacitor element 10, sealing member 12 that closes an opening of bottomed case 11, base plate 13 that covers sealing member 12, lead wires 14A, 14B that are led out from sealing member 12 and penetrate base plate 13, lead tabs 15A, 15B that connect the lead wires and electrodes of capacitor element 10, and a liquid component (not illustrated). An opening end of bottomed case 11 is curled so as to be caulked to sealing member 12.

Capacitor element 10 is produced from a wound body as illustrated in FIG. 2. The wound body is a semi-finished product of capacitor element 10, and refers to a product in which a conductive polymer is not disposed between anode body 21 having a dielectric layer on a surface and cathode body 22. The wound body is obtained by winding anode body 21 connected to lead tab 15A and cathode body 22 connected to lead tab 15B with separator 23 interposed therebetween. An outermost periphery of the wound body is fixed by fastening tape 24. Note that FIG. 2 illustrates a state in which a part of the wound body before the outermost periphery of the wound body is fixed is developed.

Anode body 21 includes a metal foil whose surface is roughened, and a dielectric layer is formed on the roughened surface. Capacitor element 10 is formed by attaching the conductive polymer to at least a part of the surface of the dielectric layer. Capacitor element 10 is housed in an outer case together with a liquid component (not illustrated).

Hereinafter, an example of a method of manufacturing an electrolytic capacitor will be described.

(i) Step of Preparing Anode Body 21 Having Dielectric Layer and Cathode Body 22

As raw materials of anode body 21 and cathode body 22, a metal foil formed of a valve metal is used. In the case of anode body 21, a surface of the metal foil is roughened by an etching treatment or the like, and a plurality of irregularities are formed on the surface of the metal foil. Next, a dielectric layer is formed on the roughened surface of the metal foil by an anodizing treatment or the like. If necessary, the surface of cathode body 22 may be roughened.

(ii) Preparation of Wound Body

Anode body 21 and cathode body 22 are wound with separator 23 interposed therebetween to produce a wound body. As separator 23, a nonwoven fabric containing synthetic cellulose as a main component can be used. Fastening tape 24 is disposed on an outer surface of cathode body 22 located at an outermost layer of the wound body to fix an end of cathode body 22. As necessary, the anodizing treatment is further performed on the wound body.

(iii) Step of Forming Capacitor Element 10

For example, the dielectric layer is impregnated with a liquid mixture containing a conductive polymer to form a film of the conductive polymer covering at least a part of the dielectric layer. Consequently, capacitor element 10 in which the conductive polymer is disposed between anode body 21 and cathode body 22 is obtained. The step of applying the liquid mixture to the surface of the dielectric layer may be repeated twice or more.

(iv) Step of Impregnating Liquid Component

Prior to impregnation of the liquid component, the liquid component is prepared. The liquid component is prepared by dissolving an anion component, optionally a cation component or an additive agent in a solvent. A capacitor element having a conductive polymer is impregnated with the prepared liquid component. The specific method of impregnation is not particularly limited. For example, immersion, liquid injection, or the like may be used.

(v) Step of Sealing Capacitor Element

Capacitor element 10 is housed in bottomed case 11 together with the liquid component such that lead wires 14A, 14B are located on an opening side of bottomed case 11. Next, an opening of bottomed case 11 is closed by sealing member 12 through which the respective lead wires pass, an opening end of bottomed case 11 is curled to caulk sealing member 12, and base plate 13 is disposed on a curled part. In this way, the electrolytic capacitor illustrated in FIG. 1 is completed.

In the above exemplary embodiment, a wound-type electrolytic capacitor has been described, but an application range of the present disclosure is not limited to the above, and the present invention can also be applied to other electrolytic capacitors, for example, a chip-type electrolytic capacitor using a metal sintered body as an anode body, or a stacked-type electrolytic capacitor using a metal plate as an anode body.

EXAMPLES

Hereinafter, the present invention is specifically described with reference to examples and comparative examples, but the present invention is not limited to the following examples.

<<Preparation of Electrolytic Capacitors A1 to A22 and B1 to B13>>

A wound type electrolytic capacitor (Φ (diameter) 8 mm×L (length) 10 mm) having a rated voltage of 35 V and a rated electrostatic capacity of 150 μF was prepared. A specific method for producing the electrolytic capacitor will be described below.

(Preparation of Anode Body)

An aluminum foil having a thickness of 100 m was subjected to an etching treatment to roughen the surface of the aluminum foil. Then, a dielectric layer was formed on the surface of the aluminum foil by an anodizing treatment. The anodizing treatment was performed by immersing the aluminum foil in an ammonium adipate solution, followed by application of a voltage of 60 V. Then, the aluminum foil was cut, whereby an anode body was prepared.

(Preparation of Cathode Body)

An aluminum foil having a thickness of 50 m was subjected to an etching treatment to roughen the surface of the aluminum foil. Then, the aluminum foil was cut, whereby a cathode body was prepared.

(Production of Wound Body)

An anode lead tab and a cathode lead tab were connected to the anode body and the cathode body, respectively, and the anode body and the cathode body were wound with a separator interposed between the anode body and the cathode body while the lead tabs were being wound. An anode lead wire and a cathode lead wire were connected to ends of the lead tabs protruding from the wound body, respectively. The produced wound body was subjected to an anodizing treatment again to form a dielectric layer on the cutting end of the anode body. Next, the end of the outer surface of the wound body was fixed with a winding stop tape, whereby the wound body was produced.

(Preparation of Liquid Mixture)

A mixed solution was prepared by dissolving, in ion-exchanged water, 3,4-ethylenedioxythiophene (EDOT) and polystyrene sulfonic acid (PSS, weight-average molecular weight: 100,000) that is a dopant. While the mixed solution was being stirred, iron(III) sulfate (oxidizing agent) dissolved in ion-exchanged water was added to perform a polymerization reaction. After the reaction, the obtained reaction solution was dialyzed to remove the unreacted monomer and excess oxidant, so that a polymer dispersion containing polyethylene dioxythiophene doped with about 5 mass % of PSS (PEDOT/PSS) was obtained.

(Formation of Solid Electrolyte)

The wound body was immersed in the liquid mixture housed in a predetermined container in a decompressed atmosphere (40 kPa) for 5 minutes, and then the wound body was picked up from the liquid mixture. Next, the wound body impregnated with the liquid mixture was dried in a drying furnace at 150° C. for 20 minutes, and at least a part of the dielectric layer was covered with a conductive polymer (solid electrolyte). A capacitor element was thus formed.

(Preparation of Liquid Component)

An electrolyte salt composed of an anion component and a cation component shown in Tables 1 to 3 was added to a mixed solvent in which each solvent was mixed at a volume ratio shown in Tables 1 to 3, and an anion component shown in Tables 1 to 3 was separately added and mixed as necessary. The addition amount of each component was adjusted so that the concentrations of the anion component and the cation component constituting the electrolyte salt and the anion component separately added in the liquid component were values shown in Tables 1 to 3. Note that the total amount of these electrolyte salts and anion components to be separately added to which a solvent is added is 100 mass %. In this way, a liquid component was prepared.

(Assembling of Electrolytic Capacitor)

The wound body on which the electrolyte was formed was immersed in the liquid component in a decompressed atmosphere (40 kPa) for 5 minutes. Thus, a capacitor element impregnated with the liquid component was obtained. The obtained capacitor element was sealed to complete an electrolytic capacitor as illustrated in FIG. 1. Thereafter, an aging treatment was performed at 130° C. for 2 hours while a rated voltage was applied.

[Evaluation: Measurement of ESR and Leakage Current]

In an environment of 20° C., initial ESR of each electrolytic capacitor at a frequency of 100 kHz was measured using an LCR meter for 4-terminal measurement. Then, an average value of 20 electrolytic capacitors was obtained.

Next, the electrolytic capacitors were accommodated in a thermostatic bath in a 140° C. atmosphere, and held for 1000 hours in a state where a rated voltage was applied, thereby performing an acceleration test. For the electrolytic capacitors after the acceleration test, ESR was measured in the same manner as described above under an environment of 20° C., and an average value for 20 electrolytic capacitors was obtained. A ratio (ESR change rate) of the average value of the ESR after the accelerated test to the average value of the initial ESR was obtained and used as an index of the fluctuation in the ESR in long-term use.

A rated voltage was applied to the electrolytic capacitors after the acceleration test in an environment of 20° C., and a leakage current value after 120 seconds was measured.

Tables 1 to 3 show evaluation results. In Tables 1 to 3, A1 to A22 represent examples, and B1 to B13 represent comparative examples. The result of each example is shown as a relative value when the result of B1 is 100. The lower numerical value of each anion or cation in Tables 1 to 3 is the concentration in the liquid component. The pKa of the second anion is shown as the numerical value in parentheses ( ) next to the second anion.

TABLE 1

| | Electrolyte salt | | | Anion component separately added | | |
|---|---|---|---|---|---|---|
| | Kinds | First anion component (mass %) | Second anion component (mass %) | Cation component (mass %) | First anion component (mass %) | Second anion component (pKa) (mass %) | Third anion component (mass %) |
| B1 | Phthalic acid TEA | Phthalic acid 7.4 | — | TEA 4.6 | Phthalic acid 10 | — | — |
| A1 | Phthalic acid TEA | Phthalic acid 7.4 | — | TEA 4.6 | — | BDSI (−1.1) 0.3 | — |
| A2 | Phthalic acid TEA | Phthalic acid 7.4 | — | TEA 4.6 | — | Saccharin (1.6) 2 | — |
| A3 | Phthalic acid TEA | Phthalic acid 7.4 | — | TEA 4.6 | — | Saccharin (1.6) 10 | — |
| A4 | Phthalic acid TEA | Phthalic acid 7.4 | — | TEA 4.6 | — | Saccharin (1.6) 17 | — |
| A5 | Phthalic acid TEA | Phthalic acid 7.4 | — | TEA 4.6 | — | Saccharin (1.6) 17 | Catechol 1 p-nitrophenol 0.25 |
| A6 | Saccharin TEA | — | Saccharin 7.7 | TEA 4.3 | Phthalic acid 5 | Saccharin (1.6) 7.7 | — |
| A7 | Phthalic acid TEA | Phthalic acid 7.4 | — | TEA 4.6 | Phthalic acid 2.8 | TFSA (4.4) 7.5 | — |
| A8 | Phthalic acid TEA | Phthalic acid 7.4 | — | TEA 4.6 | Phthalic acid 2.9 | Saccharin (1.6) 7.5 | — |
| A9 | Phthalic acid EDMA | Phthalic acid 8.3 | — | EDMA 3.7 | Salicylic acid 2.5 | Saccharin (1.6) 7.5 | — |
| A10 | Phthalic acid EDMA | Phthalic acid 5.5 | — | EDMA 2.5 | — | Saccharin (1.6) 0.6 | — |
| A11 | Phthalic acid EDMA | Phthalic acid 5.5 | — | EDMA 2.5 | Salicylic acid 2 | Saccharin (1.6) 5 | — |

| | Solvent | | Initial ESR | ESR change rate | Leakage current |
|---|---|---|---|---|---|
| | Kinds | Volume ratio | | | |
| B1 | EG | 25 | 100 | 100 | 100 |
| | SL | 25 | | | |
| | PEG | 50 | | | |
| A1 | EG | 25 | 92 | 30 | 80 |
| | SL | 25 | | | |
| | PEG | 50 | | | |
| A2 | EG | 25 | 91 | 38 | 71 |
| | SL | 25 | | | |
| | PEG | 50 | | | |
| A3 | EG | 25 | 89 | 18 | 60 |
| | SL | 25 | | | |
| | PEG | 50 | | | |
| A4 | EG | 25 | 88 | 15 | 47 |
| | SL | 25 | | | |
| | PEG | 50 | | | |
| A5 | EG | 25 | 85 | 12 | 41 |
| | SL | 25 | | | |
| | PEG | 50 | | | |
| A6 | EG | 25 | 90 | 25 | 55 |
| | SL | 25 | | | |
| | PEG | 50 | | | |
| A7 | EG | 10 | 92 | 35 | 66 |
| | GBL | 40 | | | |
| | PEG | 50 | | | |
| A8 | EG | 10 | 89 | 23 | 51 |
| | GBL | 40 | | | |
| | PEG | 50 | | | |
| A9 | EG | 20 | 88 | 16 | 74 |
| | SL | 60 | | | |
| | GLY | 20 | | | |

TABLE 1-continued

| | | | | | |
|---|---|---|---|---|---|
| A10 | EG | 10 | 93 | 40 | 80 |
| | GBL | 40 | | | |
| | PEG | 50 | | | |
| A11 | EG | 10 | 91 | 22 | 78 |
| | GBL | 40 | | | |
| | PEG | 50 | | | |

TEA: triethylamine
BDSI: 1,2-benzenedisulfonic acid imide
EDMA: ethyldimethylamine
GBL: γ-butyrolactone
SL: sulfolane
PEG: polyethylene glycol
GLY: glycerin
EG: ethylene glycol

TABLE 2

| | | Electrolyte salt | | Anion component separately added | |
|---|---|---|---|---|---|
| | Kinds | First anion component (mass %) | Cation component (mass %) | First anion component (mass %) | Second anion component (pKa) (mass %) |
| B1 | Phthalic acid TEA | Phthalic acid 7.4 | TEA 4.6 | Phthalic acid 10 | — |
| A12 | Phthalic acid EDMA | Phthalic acid 5.5 | EDMA 2.5 | — | Saccharin (1.6) 12 |
| A13 | Phthalic acid EDMA | Phthalic acid 5.5 | EDMA 2.5 | — | DPTSA (−0.5) 0.5 |
| A14 | Phthalic acid EDMA | Phthalic acid 5.5 | EDMA 2.5 | — | Saccharin (1.6) 2.5 DPTSA (−0.5) 0.5 |
| A15 | Phthalic acid EDMA | Phthalic acid 5.5 | EDMA 2.4 | — | BDSI (−1.1) 0.5 |
| A16 | Phthalic acid TMIZ | Phthalic acid 4.6 | TMIZ 3.4 | Phthalic acid 0.5 Salicylic acid 2.5 | Saccharin (1.6) 5 |
| A17 | Phthalic acid TMIZ | Phthalic acid 4.6 | TMIZ 3.4 | Phthalic acid 0.5 Benzoic acid 2.5 | Saccharin (1.6) 5 |
| A18 | Salicylic acid EDMA | Salicylic acid 5.2 | EDMA 2.8 | Salicylic acid 0.3 | Saccharin (1.6) 2 |
| A19 | Salicylic acid EDMA | Salicylic acid 3.3 | EDMA 1.7 | Phthalic acid 2 Salicylic acid 0.2 | Saccharin (1.6) 5 |
| A20 | Borodisalicylic acid EDMA | Borodisalicylic acid 8 | EDMA 2 | — | Saccharin (1.6) 2 |
| A21 | Borodisalicylic acid EDMA | Borodisalicylic acid 8 | EDMA 2 | — | TFSA (4.4) 2 |
| A22 | Adipic acid TEA | Adipic acid 3 | TEA 2 | — | Saccharin (1.6) 2 |

| | Solvent | | Initial | ESR change | Leakage |
|---|---|---|---|---|---|
| | Kinds | Volume ratio | ESR | rate | current |
| B1 | EG | 25 | 100 | 100 | 100 |
| | SL | 25 | | | |
| | PEG | 50 | | | |
| A12 | EG | 10 | 86 | 17 | 65 |
| | GBL | 40 | | | |
| | PEG | 50 | | | |
| A13 | EG | 10 | 88 | 22 | 52 |
| | GBL | 40 | | | |
| | PEG | 50 | | | |
| A14 | EG | 10 | 90 | 19 | 43 |
| | GBL | 40 | | | |
| | PEG | 50 | | | |
| A15 | EG | 10 | 86 | 30 | 81 |
| | GBL | 40 | | | |
| | PEG | 50 | | | |

TABLE 2-continued

| | | | | | |
|---|---|---|---|---|---|
| A16 | EG | 50 | 90 | 26 | 73 |
| | SL | 30 | | | |
| | PEG | 20 | | | |
| A17 | EG | 50 | 91 | 31 | 46 |
| | SL | 30 | | | |
| | PEG | 20 | | | |
| A18 | EG | 10 | 89 | 30 | 77 |
| | SL | 40 | | | |
| | PEG | 50 | | | |
| A19 | EG | 10 | 86 | 34 | 44 |
| | SL | 40 | | | |
| | PEG | 50 | | | |
| A20 | EG | 20 | 85 | 39 | 75 |
| | GBL | 50 | | | |
| | PEG | 30 | | | |
| A21 | EG | 20 | 91 | 35 | 81 |
| | GBL | 50 | | | |
| | PEG | 30 | | | |
| A22 | EG | 20 | 85 | 40 | 65 |
| | GBL | 50 | | | |
| | PEG | 30 | | | |

TEA: triethylamine
BDSI: 1,2-benzenedisulfonic acid imide
EDMA: ethyldimethylamine
TFSA: trifluoromethanesulfonanilide
TMIZ: 1,2,3,4-tetramethylimidazolinium
DPTSA: 4-methyl-N-[(4-methylphenyl) sulfonyl] benzenesulfonamide
GBL: γ-butyrolactone
SL: sulfolane
PEG: polyethylene glycol
GLY: glycerin
EG: ethylene glycol

TABLE 3

| | Electrolyte salt | | | Anion component separately added | | |
|---|---|---|---|---|---|---|
| | Kinds | First anion component (mass %) | Third anion component (mass %) | Cation component (mass %) | First anion component (mass %) | Second anion component (pKa) (mass %) | Third anion component (mass %) |
| B1 | Phthalic acid TEA | Phthalic acid 7.4 | — | TEA 4.6 | Phthalic acid 10 | — | — |
| B2 | Phthalic acid TEA | Phthalic acid 7.4 | — | TEA 4.6 | Phthalic acid 0.3 | — | — |
| B3 | Phthalic acid TEA | Phthalic acid 7.4 | — | TEA 4.6 | Phthalic acid 17 | — | — |
| B4 | Phthalic acid TEA | Phthalic acid 7.4 | — | TEA 4.6 | Phthalic acid 10 | — | — |
| B5 | Phthalic acid EDMA | Phthalic acid 8.3 | — | EDMA 3.7 | Salicylic acid 10 | — | — |
| B6 | Phthalic acid EDMA | Phthalic acid 5.5 | — | EDMA 2.5 | Phthalic acid 0.5 | — | — |
| B7 | Phthalic acid EDMA | Phthalic acid 5.5 | — | EDMA 2.5 | Phthalic acid 12 | — | — |
| B8 | Phthalic acid TMIZ | Phthalic acid 4.6 | — | TMIZ 3.4 | Phthalic acid 0.5 Benzoic acid 2.5 | — | — |
| B9 | Salicylic acid EDMA | Salicylic acid 5.2 | — | EDMA 2.8 | Salicylic acid 1.9 | — | — |
| B10 | Salicylic acid EDMA | Salicylic acid 3.3 | — | EDMA 1.7 | Phthalic acid 2 Salicylic acid 0.2 | — | — |
| B11 | Borodisalicylic acid EDMA | Borodisalicylic acid 8 | — | EDMA 2 | — | — | — |
| B12 | Adipic acid TEA | Adipic acid 3 | — | TEA 2 | Adipic acid 2 | — | — |
| B13 | Pyrogallol TEA | — | Pyrogallol 2.8 | TEA 2.2 | — | Saccharin (1.6) 2 | — |

TABLE 3-continued

| | Solvent | | Initial ESR | ESR change rate | Leakage current |
|---|---|---|---|---|---|
| | Kinds | Volume ratio | | | |
| B1 | EG | 25 | 100 | 100 | 100 |
| | SL | 25 | | | |
| | PEG | 50 | | | |
| B2 | EG | 25 | 120 | 288 | 238 |
| | SL | 25 | | | |
| | PEG | 50 | | | |
| B3 | EG | 25 | 95 | 223 | 355 |
| | SL | 25 | | | |
| | PEG | 50 | | | |
| B4 | EG | 10 | 96 | 98 | 105 |
| | GBL | 40 | | | |
| | PEG | 50 | | | |
| B5 | EG | 20 | 94 | 91 | 168 |
| | SL | 60 | | | |
| | GLY | 20 | | | |
| B6 | EG | 10 | 107 | 123 | 89 |
| | GBL | 40 | | | |
| | PEG | 50 | | | |
| B7 | EG | 10 | 95 | 80 | 84 |
| | GBL | 40 | | | |
| | PEG | 50 | | | |
| B8 | EG | 50 | 98 | 91 | 142 |
| | SL | 30 | | | |
| | PEG | 20 | | | |
| B9 | EG | 10 | 95 | 82 | 169 |
| | SL | 40 | | | |
| | PEG | 50 | | | |
| B10 | EG | 10 | 94 | 72 | 204 |
| | SL | 40 | | | |
| | PEG | 50 | | | |
| B11 | EG | 20 | 94 | 52 | 129 |
| | GBL | 50 | | | |
| | PEG | 30 | | | |
| B12 | EG | 20 | 138 | 420 | 90 |
| | GBL | 50 | | | |
| | PEG | 30 | | | |
| B13 | EG | 20 | 117 | 85 | 140 |
| | GBL | 50 | | | |
| | PEG | 30 | | | |

TEA: triethylamine
EDMA: ethyldimethylamine
TMIZ: 1,2,3,4-tetramethylimidazolinium
GBL: γ-butyrolactone
SL: sulfolane
PEG: polyethylene glycol
GLY: glycerin
EG: ethylene glycol As shown in Table 3, in a case where only the first anion component was used without using the second anion component and in a case where the second anion component and the third anion component were used without using the first anion component, in both the cases, the leakage current after the accelerated test was increased, and the ESR change rate by the accelerated test was also a large value. On the other hand, as shown in Tables 1 and 2, in a case where both the first anion component and the second anion component were used, the leakage current could be suppressed to be relatively small even after the acceleration test, the ESR change rate was small, and stable capacitor performance was obtained. Furthermore, in Examples, the initial ESR was also suppressed to be low.

The electrolytic capacitor of the present disclosure can be used as a hybrid type electrolytic capacitor. The electrolytic capacitor is particularly suitable for applications requiring high reliability. However, the application of the electrolytic capacitor is not limited thereto.

The invention claimed is:

1. An electrolytic capacitor comprising:
    a capacitor element containing a conductive polymer; and
    a liquid component, wherein
    the liquid component includes a first anion component and a second anion component, the first anion component having a carbonyloxy bond, the second anion component having no carbonyloxy bond and having a sulfonylimide bond.

2. The electrolytic capacitor according to claim 1, wherein an acid dissociation constant pKa of the second anion component in a form of a free acid is 5.0 or less.

3. The electrolytic capacitor according to claim 1, wherein a content of the second anion component in the liquid component ranges from 3 parts by mass to 250 parts by mass, inclusive, with respect to 100 parts by mass of the first anion component.

4. The electrolytic capacitor according to claim 1, wherein the liquid component further includes a cation component.

5. The electrolytic capacitor according to claim 4, wherein a molar ratio of the first anion component to the cation component in the liquid component ranges from 1 to 10, inclusive.

* * * * *